US012321347B1

(12) United States Patent
Sun et al.

(10) Patent No.: US 12,321,347 B1
(45) Date of Patent: Jun. 3, 2025

(54) QUERY PERFORMANCE IMPROVEMENT OF A QUERY FOR A DATABASE APPLICATION USING REWRITE

(71) Applicant: International Business Machines Corporation, Armonk, NY (US)

(72) Inventors: Sheng Yan Sun, Beijing (CN); Xu Qin Zhao, Beijing (CN); Si Er Han, Xi'an (CN); Xue Ying Zhang, Xi'an (CN); Xiao Ming Ma, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/621,385

(22) Filed: Mar. 29, 2024

(51) Int. Cl.
*G06F 16/2453* (2019.01)
*G06F 11/34* (2006.01)

(52) U.S. Cl.
CPC .... *G06F 16/24534* (2019.01); *G06F 11/3409* (2013.01)

(58) Field of Classification Search
CPC ........................ G06F 16/24534; G06F 11/3409
See application file for complete search history.

(56) References Cited

U.S. PATENT DOCUMENTS

| 9,773,055 | B2 | 9/2017 | Pfleger |
| 2009/0077016 | A1 | 3/2009 | Belknap et al. |
| 2012/0259881 | A1* | 10/2012 | Dettinger ............ G06F 16/2471 707/765 |
| 2013/0297586 | A1 | 11/2013 | Singh et al. |
| 2023/0385561 | A1* | 11/2023 | Kennedy, Jr. ........... G06F 40/51 |
| 2024/0070204 | A1* | 2/2024 | Prakash ................ G06F 16/243 |

FOREIGN PATENT DOCUMENTS

CN 106489146 A 3/2017

OTHER PUBLICATIONS

Anonymous, "Generating query recommendations to improve query performance (Query Rewrite Advisor)," URL: https://ibm.github.io/db2forzosdeveloperextension-about/docs/tuning-sql-queries/generating-query-recommendations; Retrieved: Dec. 11, 2023; 2 pages.
Anonymous, "IBM SQL Tuning Services," URL: https://www.ibm.com/docs/en/db2-for-zos/12?topic=db2-sql-tuning-services; Retrieved: Jan. 12, 2024; 2 pages.
(Continued)

*Primary Examiner* — Cam Y T Truong
(74) *Attorney, Agent, or Firm* — CANTOR COLBURN LLP; Kelsey Skodje

(57) ABSTRACT

A method for improving a query performance of a query of a database application using rewrite includes introducing a database query into a database application to obtain a query result, analyzing the database query to identify index columns and a predicate column; identifying associated columns by determining if any associations exist between the index columns and the predicate column, calculating a confidence score value for each of the associated columns responsive to the associated columns and the predicate column, generating a list of associated columns with the confidence score values, generating a rewritten query by rewriting the database query based on the list of associated columns and the confidence score values and validating the rewritten query.

20 Claims, 16 Drawing Sheets

(56) References Cited

OTHER PUBLICATIONS

Anonymous, "Your Database, Just Faster SQL query optimization, database observability and cost reduction, AIpowered," URL: https://www.eversql.com; Retrieved: Dec. 11, 2023; 14 pages.
Bai et al., "QueryBooster: Improving SQL Performance Using Middleware Services for Human-Centered Query Rewriting," arXiv:2305.08272v1 [cs.DB] May 14, 2023, pp. 1-15.
Zhou et al., "A Learned Query Rewrite System using Monte Carlo Tree Search," Proceedings of the VLDB Endowment, vol. 15, No. 1, ISSN 2150-8097, 13 pages.

* cited by examiner

Original query is required to scan all data in the entire database

Data Association Learning-example

Data Example:                                                                   202A

| Address1 | City | State | Country | PostalCode |
|---|---|---|---|---|
| 1666 country Road 109A | IGNACIO | CO | USA | 81137 |
| 219 Smith | MANASSA | CO | USA | 81140 |
| 38 Lone Pne | DURANGO | CO | USA | 81301 |
| 115 Pennsylvania Royalty | LA JUNTA | CO | USA | 81050 |
| 57680 STATE HIGHWAY 69 | LAMAR | CO | USA | 81052 |
| PO BOX 1214 | WESTCLFFE | CO | USA | 81252 |
| 1580 SNEEFFL ST | WESTCLFFE | CO | USA | 81424 |
| 571 COYOTE DR | NUCLA | CO | USA | 81401 |
| 9 Palm Pennsylvania | MONITOSW | CO | USA | 81401 |
| 3409 1ST ST S | GUFFEY | CO | USA | 82341 |

User original SQL:

Select * from Addresses where Address1 like '%Pennsylvania%'

Where the predicate column: Address1, the predicate value Pennsylvania

FIG. 5D

Data Association Learning-example

- Step 1. Compute the association between the column in requested predicate and other index columns
  - Cramer's V is a statistical measure utilized to assess the strength of association between variables. The value is in the range of [0,1]. A higher Cramer's V value indicates a stronger level of association.
- Step 2. Select the top N columns that have strong association with column in requested predicate
  - In the example, assume N=2, and the columns PostalCode and City are selected columns according to the Cramer's V
- Step 3. Calculate the count of the combination of the value in the requested predicate and values in each selected column

|  | PostalCode |  |  |  |  |  |  |
|---|---|---|---|---|---|---|---|
| Address1 | 81505 | 81401 | 81301 | 81137 | 81052 | 81252 | 81424 | 81100 | 82341 |
| Pennsylvania | 1 | 1 | 0 | 1 | 0 | 0 | 0 | 0 | 0 |

|  | City |  |  |  |  |  |  |
|---|---|---|---|---|---|---|---|
| Address1 | LA JUNTA | NUCLA | DURANGO | IGNACIO | LAMAR | WESTCLIFFE | WESTCLIFFE | MANASSA | GUFFEY |
| Pennsylvania | 1 | 1 | 0 | 0 | 0 | 0 | 0 | 0 | 0 |

Data Association Learning-example

| | Postalcode | | | | | | | | 202A |
|---|---|---|---|---|---|---|---|---|---|
| Address1 | 81505 | 81401 | 81137 | 81301 | 81052 | 81252 | 81424 | 81100 | 82341 |
| Pennsylvania | 1 | 1 | 1 | 0 | 0 | 0 | 0 | 0 | 0 |
| | City | | | | | | | | |
| Address1 | LA JUNTA | NUCLA | DURANGO | IGNACIO | LAMAR | WESTCLIFFE | WESTCLIFFE | MANASSA | GUFFEY |
| Pennsylvania | 1 | 1 | 0 | 0 | 0 | 0 | 0 | 0 | 0 |

- Step 4. Arrange the values in each selected column in descending order based on their frequency counts
  - combination count of postalcode = 3
  - combination count of City = 2
- Step 5. Generate candidate columns in order of confidence score
  - confidence score = index cluster ratio/combination count

FIG. 5F

Query Rewrite

PostalCode wins since it has better confidence score

| | PostalCode | | | | | | | |
|---|---|---|---|---|---|---|---|---|
| Address1 | 81505 | 81401 | 81301 | 81137 | 81052 | 81252 | 81424 | 81100 | 82341 |
| Pennsylvania | 1 | 2 | 2 | 2 | 2 | 2 | 2 | 2 | 2 |

202A

Rewrite SQL:
Select * from Addresses where Address1 like '%Pennsylvania%' and PostalCode in (81505, 81401)

FIG. 6B

QUERY PERFORMANCE IMPROVEMENT OF A QUERY FOR A DATABASE APPLICATION USING REWRITE

BACKGROUND

The present invention generally relates to database applications, and more particularly, to a method for improving query performance of a database application.

Query performance is very critical for database applications and typically include a separation between the business layer and the entity logic layer. In general, database application usage, because of the separation of the business layer and the entity logic layer, provides database designers and program developers with a rich business and project experience. When implementing a query, developers tend to focus on the database definition of the query terms. Accordingly, there are cases where, due to semantics and usage of the database query by a natural individual, the query terms may be given a default meaning. Moreover, it is common that data located in different columns may be correlated with each other. Thus, when developing queries, it is difficult for the query developer to perceive the correct data correlation because related query predicates are typically interdependent and have an internal relationship of hierarchical transfer.

SUMMARY

A method for improving a query performance of a query of a database application using rewrite includes introducing a database query into a database application to obtain a query result, analyzing the database query to identify index columns and a predicate column; identifying associated columns by determining if any associations exist between the index columns and the predicate column, calculating a confidence score value for each of the associated columns responsive to the associated columns and the predicate column, generating a list of associated columns with the confidence score values, generating a rewritten query by rewriting the database query based on the list of associated columns and the confidence score values and validating the rewritten query.

Embodiments of the invention are also directed to computer-implemented methods and computer program products having substantially the same features and functionality as the computer system described above.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5D is a functional block diagram illustrating a data association learning example, in accordance with one or more embodiments of the present invention;

FIG. 5E is a functional block diagram illustrating a data association learning example, in accordance with one or more embodiments of the present invention;

FIG. 5F is a functional block diagram illustrating a data association learning example, in accordance with one or more embodiments of the present invention;

FIG. 6B is a functional block diagram illustrating a query rewrite example, in accordance with one or more embodiments of the present invention;

DETAILED DESCRIPTION

As discussed briefly above, database query performance is very critical for database applications. Unfortunately, one issue that currently affects query performance involves query searches where deviations in the search queries occur due to the query terms being given a default meaning based on semantics and common language differences (i.e., slang, nicknames, local accents', etc.). One attempt at improving query performance involves the development of systems that analyze a user's Structured Query Language (SQL) query language and provides recommendations on how best to rewrite the SQL query language to improve the query performance. Another attempt at improving query performance involves the development of relational databases with the ability to rewrite the SQL query language that is used to create a user's database query prior to the execution of the query. Consider the example: WHERE T1.C1=T2.C1 AND T1.C1 IN (1, 2, 3). When you add the local predicate "T2.C1 IN (1, 2, 3)", the database can use this predicate to filter the table as an earlier point in time and reduce the number of rows that need to be joined at a later point in time. Unfortunately, because the SQL rewrite capabilities are conditioned on predefined rules, this ability is only limited to a small set of cases.

Figure 1:
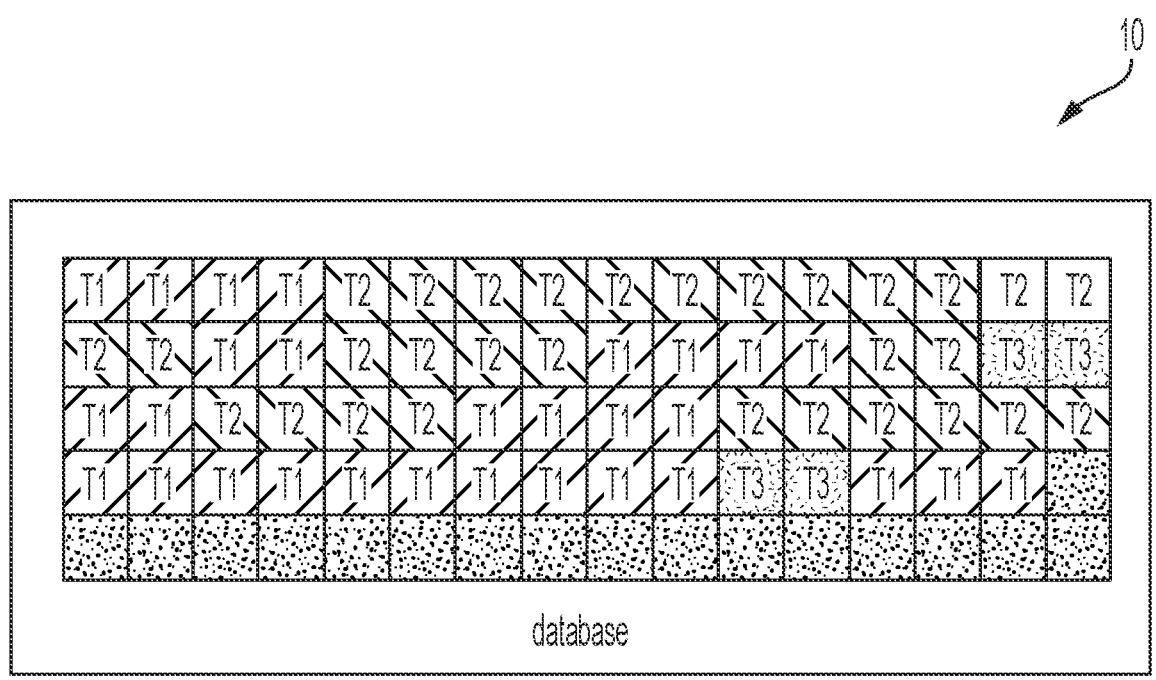
FIG. 1 shows a database table for an original query, where the original query is required to scan all of the data in the database table.
Figure 2:
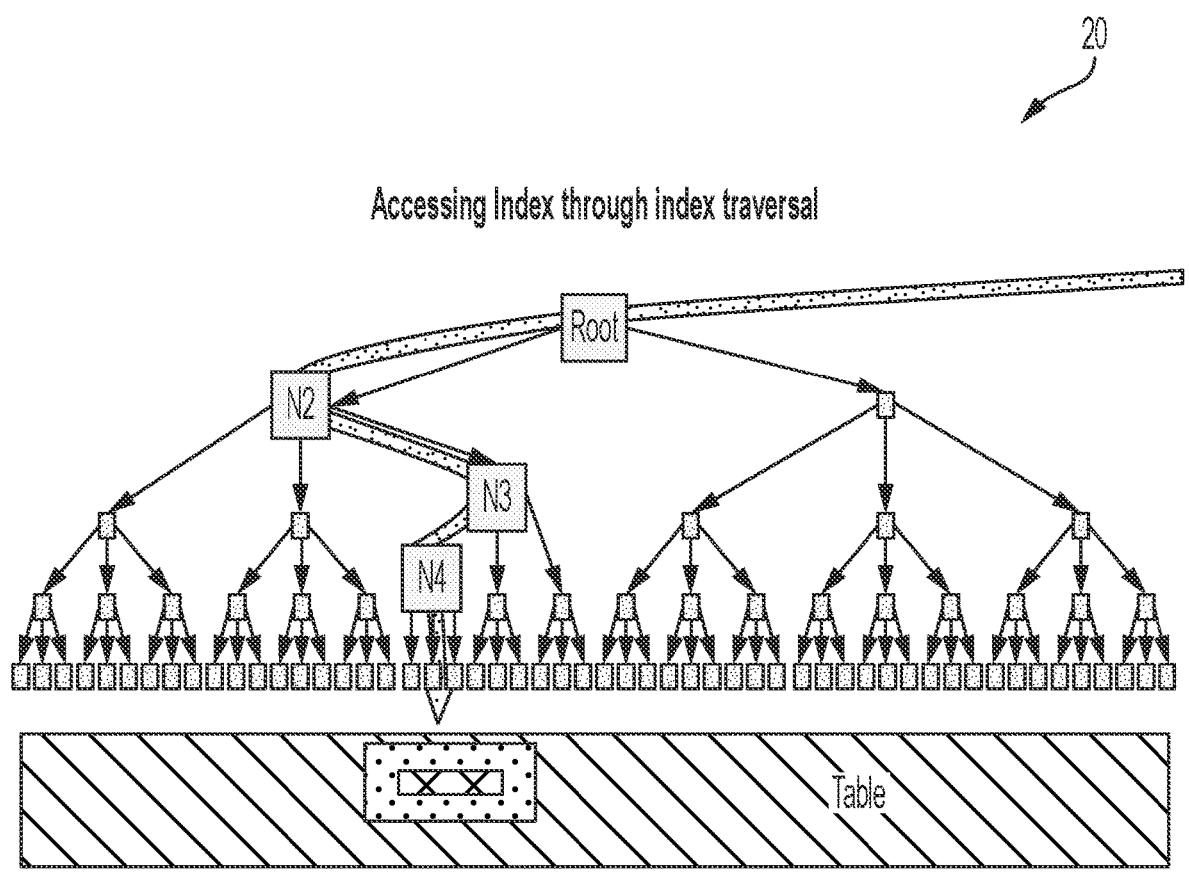
FIG. 2 shows an index table where a 'better' written query than the original query is only required to retrieve a small set of data which is sorted by an index table, in accordance with one or more embodiments of the present invention.

Consider the example where the database table definitions are as given as: "CREATE TABLE Addresses (Id INT NOT NULL IDENTITY (1, 1) PRIMARY KEY CHECK (Id>0); Address1 VARCHAR (120) NOT NULL; City VARCHAR (100) NOT NULL; State CHAR (2) NOT NULL; Country CHAR (2) NOT NULL; PostalCode VARCHAR (16) NOT NULL)", and some of the table indexes are defined as: Index1=City Column; and Index2=PostalCode column. Consider that the user's original query is "Select * from Addresses where Address1 like '% Pennsylvania %'". As shown in FIG. 1, in order to obtain a query result, this approach requires the query to scan all of the data in the database table 10. On the other hand, as shown in FIG. 2, a better performing query may be created if the query is rewritten as "Select * from Addresses where Address1 like '% Pennsylvania %' and City='Washington'" which inserts a City predicate. Since there is an index for column City, then by adding the City predicate, the query does not have to scan all of the table data. Rather the query only has to retrieve a small set of data sorted by the index 20.

Generally, the invention provides a method for automatically and reliably detecting, determining and addressing possible performance issues with a database query by rewriting the query. The method includes analyzing the query predicate (i.e., predicate type, predicate column, etc.) and database characteristics/statistics (i.e., index columns, index cluster ratio, etc.) and to use syntactic structure and value analysis to train and build database query models for re-writing the database query in an effective and efficient way. Additionally, an embodiment of the invention provides a method which parses the query text to identify and extract one or more predicate columns and to determine candidate index columns based on catalog data. The method further includes recommending a 'best index column' based on association statistics by calculating an association between the predicate columns and other index columns. A query rewrite recommendation is generated, the SQL query language is re-written for a new query and the new query is tested to verify the result and performance. The data statistics may be monitored and the database query model may be automatically updated as needed.

Figure 3:
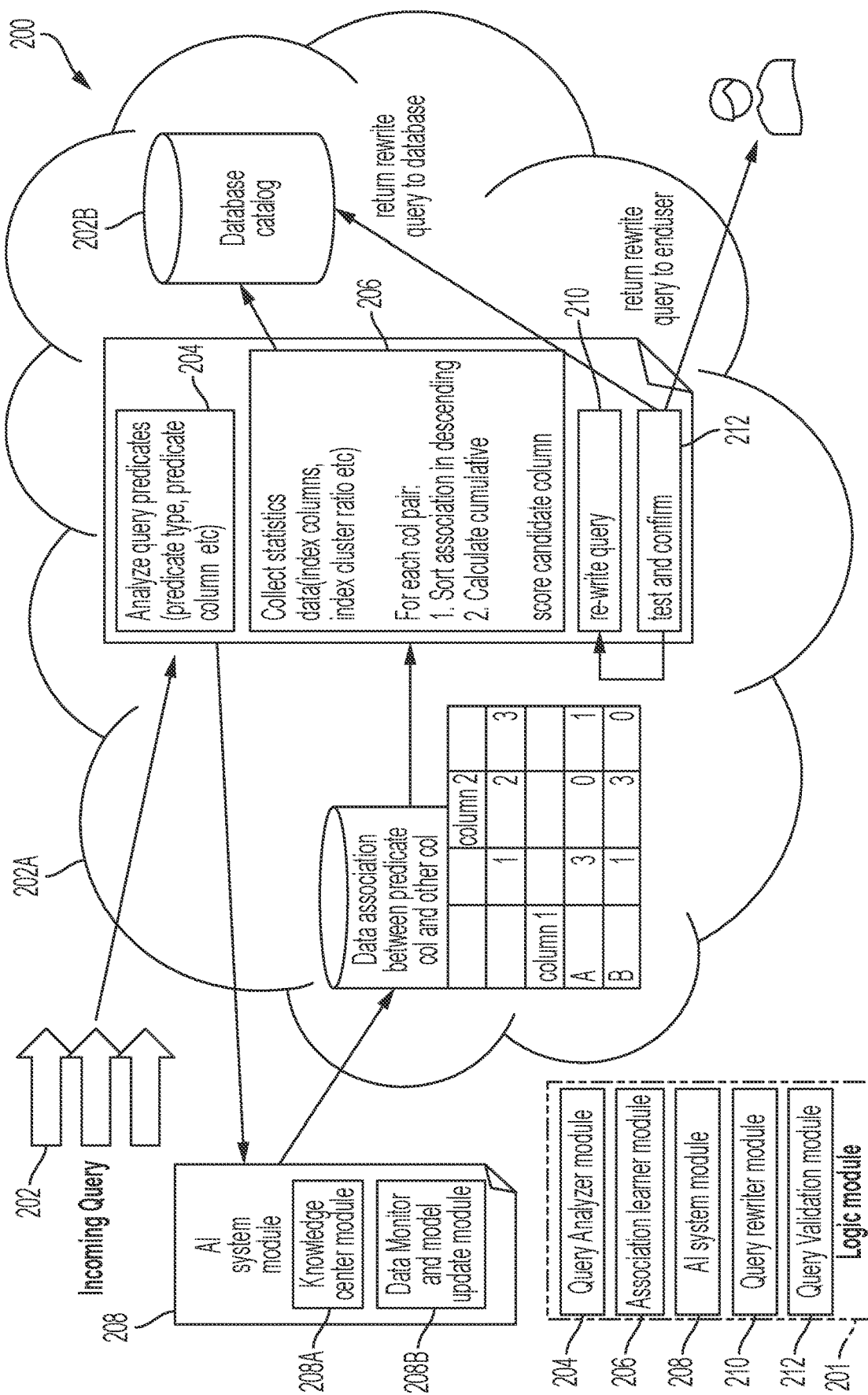
FIG. 3 shows a high level block diagram describing a method for improving a query performance of a query of a database application using rewrite, in accordance with one or more embodiments of the present invention.
Figure 4:
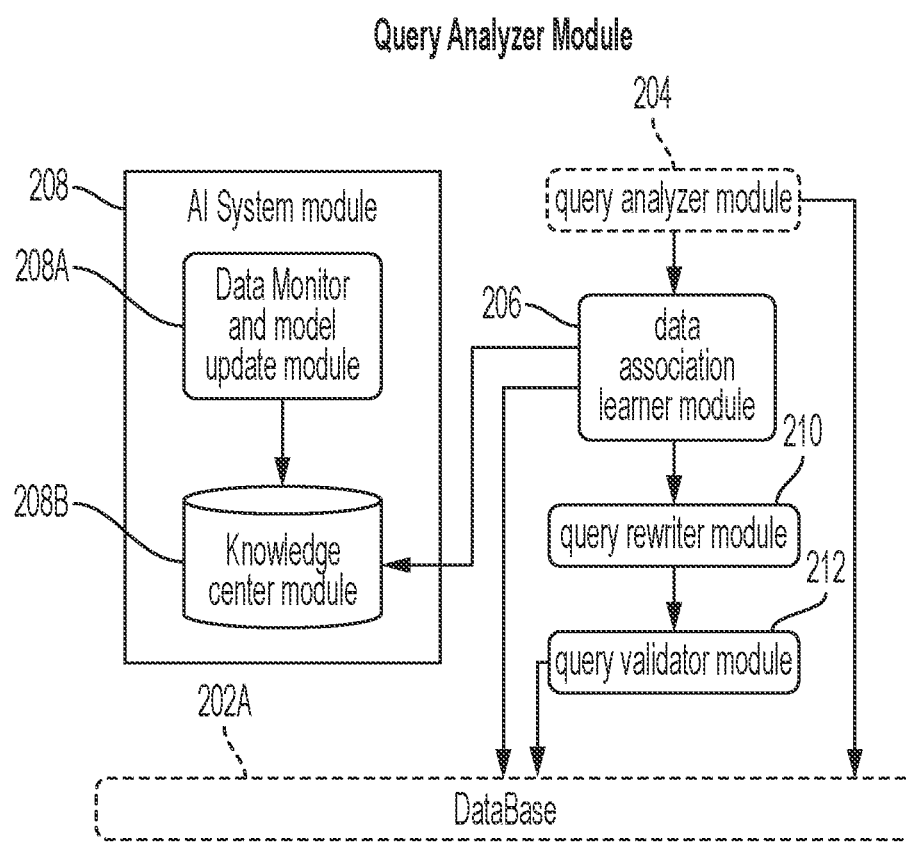
FIG. 4 is a functional block diagram illustrating a query analyzer module for use in the method for improving the query performance of a database application using rewrite of FIG. 1, in accordance with one or more embodiments of the present invention.
Figure 5A:
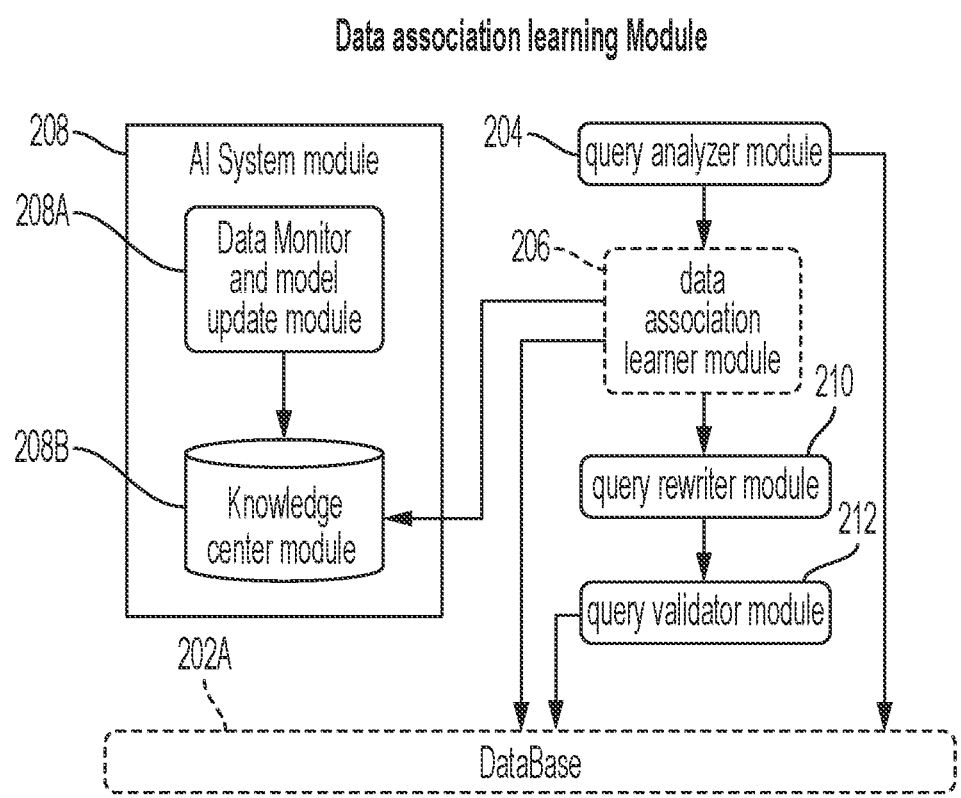
FIG. 5A is a functional block diagram illustrating a data association module for use in the method for improving the query performance of a database application using rewrite of FIG. 1, in accordance with one or more embodiments of the present invention.
Figure 5B:
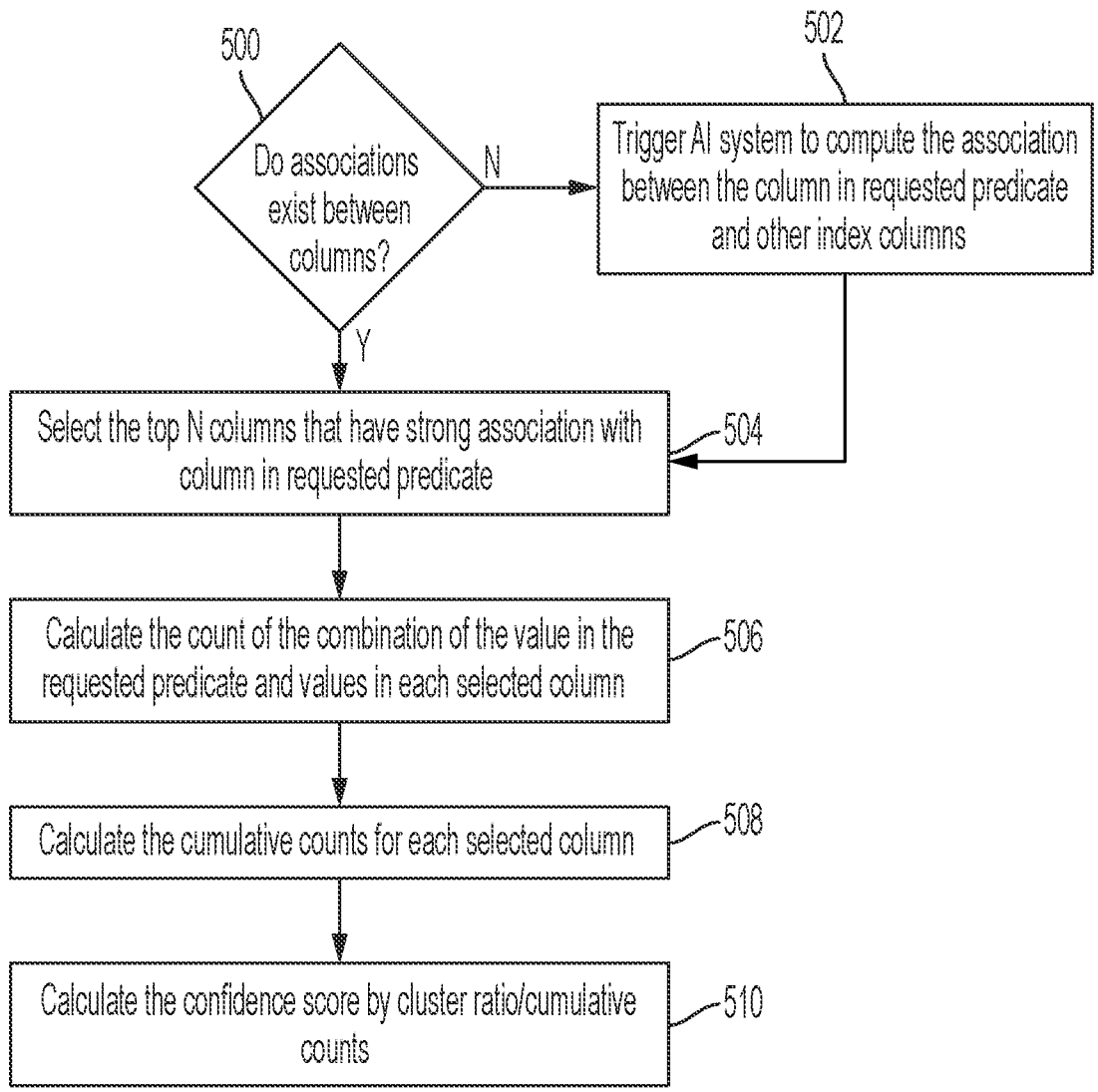
FIG. 5B is a functional block diagram illustrating a data association process, in accordance with one or more embodiments of the present invention.
Figure 5C:
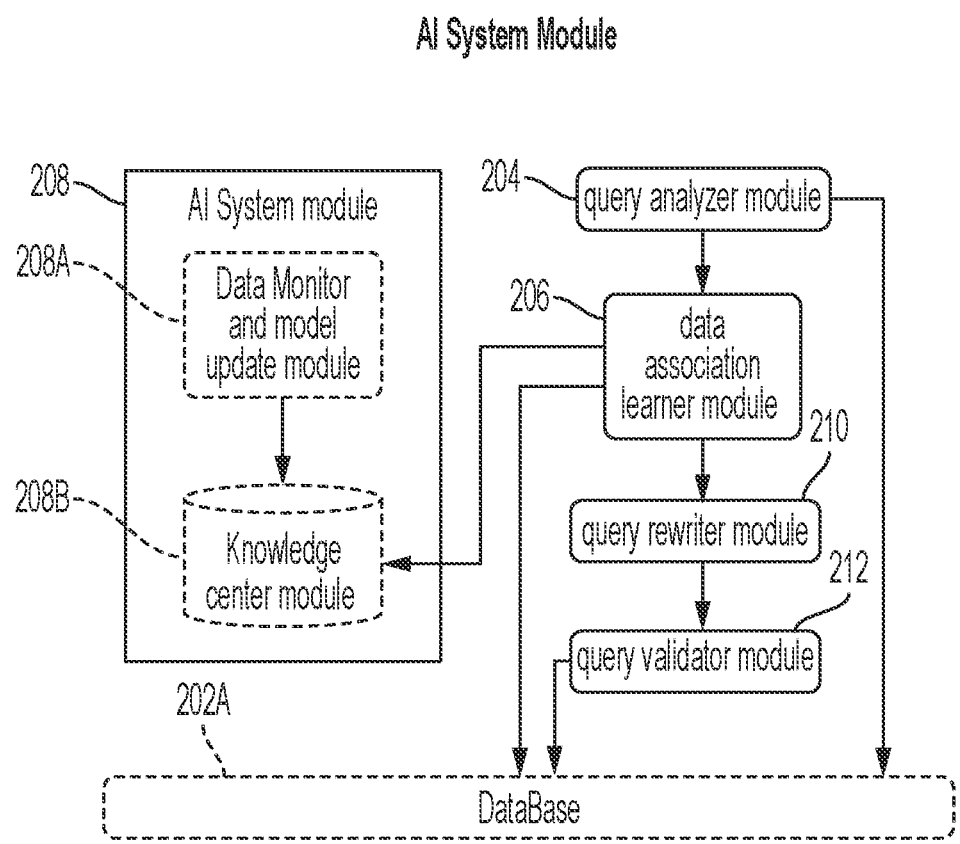
FIG. 5C is a functional block diagram illustrating an AI system module, in accordance with one or more embodiments of the present invention.

Referring to FIG. 3, a block diagram generally illustrating a method 200 for automatically detecting, determining and addressing performance issues with a database query via a logic module 201 is provided, where the logic module 201 may include a query analyzer 204, a data association learner module 206, an AI system module 208 and a query rewriter module 210. The method 200 includes receiving an incoming query 202 into a relational database 202A. Referring to FIG. 4, the received query is communicated to a query analyzer module 204, where the query analyzer module 204 analyzes the query predicates (such as predicate type, predicate column, etc.), reads a database catalog 202B of the relational database 202A to obtain database statistics data, such as index definitions, index statistics, index columns, index cluster ratios, etc. The query analyzer module 204 analyzes the database statistics data and outputs the predicate column and index columns to a data association learner module 206. Referring to FIG. 5A and FIG. 5B, the data association learner module 206 examines the predicate column and index columns to determine if any associations exist between columns 500. If no associations exist, then the data association learner module 206 triggers an AI system module 208, which may include a knowledge center module 208A and a data monitor and model update module 208B, to tune the query by computing the association between the column in the requested predicate and the other index columns 502. Referring to FIG. 5C, the knowledge center module 208A and the data monitor and model update module 208B of the AI system module 208 are configured to store the column association model, monitor data and each column value's statistics, such as distribution in background, and if one column distribution has changed, update the association models related with the columns based on updated data in time. The data association learner module 206 selects the top N columns that have a strong association with the requested predicate column 504, calculates the count of the combination of the value in the requested predicate column and the values in each of the selected columns 506, calculates the cumulative counts for each of the selected columns 508 and calculates a confidence score by dividing the cluster ratio by the cumulate counts 510.

Referring to FIG. 5B and FIG. 5D to FIG. 5F, a data association learning example is shown, where a user query of the relational database 202B is submitted such that the user query in SQL is given as follows:

Select * from Addresses where Address1 line '% Pennsylvania %', where the predicate column Address1 includes the predicate value Pennsylvania. As discussed above, the association between the predicate column in requested query and other index columns is computed 502. For example, Cramer's V is a statistical measure utilized to assess the strength of an association between variables. The value is in the range of [0,1], where a higher Cramer's V value indicates a stronger level of association. The top N columns that have a strong association with the column in the requested predicate are selected 504. In this example, it is assumed that N=2, and that the columns PostalCode and City are selected columns according to the Cramer's V. The count of the combination of the value in the requested predicate and the values in each of the selected columns are calculated 506 and cumulative counts for each of the selected columns 508 are calculated 508 and the values are arranged in descending order based on the frequency of their cumulative counts. A candidate confidence score is calculated by dividing the cluster ratio by the cumulate counts 510, where a list of the candidate columns are generated in order of the confidence score.

Figure 6A:
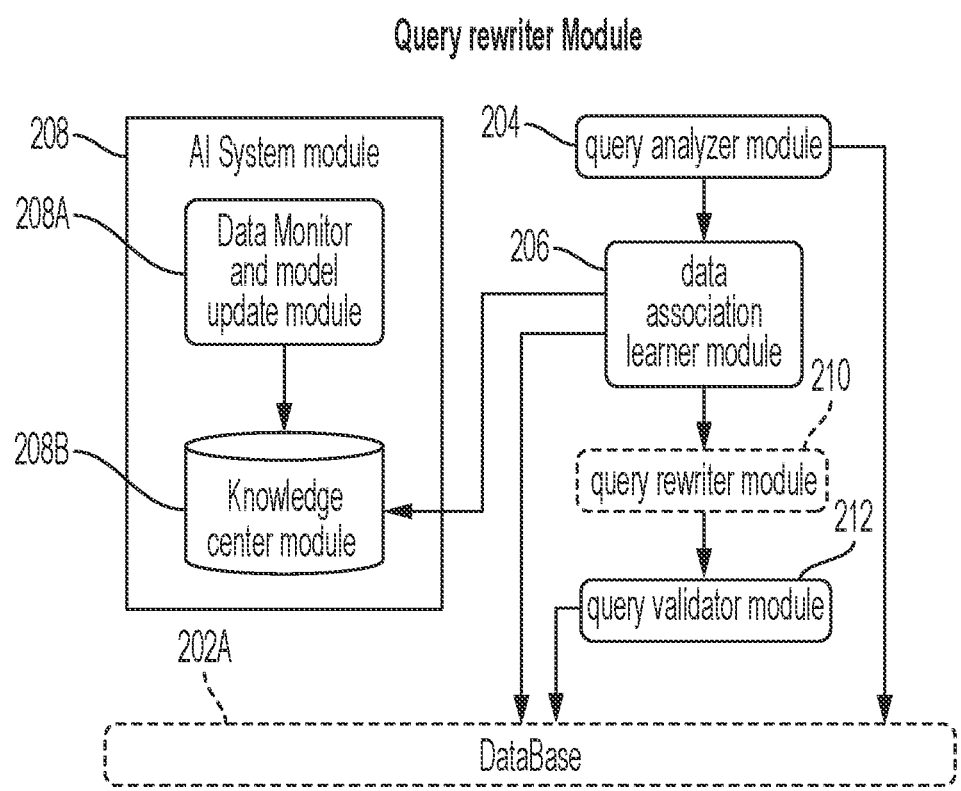
FIG. 6A is a functional block diagram illustrating a query rewriter module, in accordance with one or more embodiments of the present invention.

Referring to FIG. 6A, FIG. 6B and again to FIG. 3, the list of the candidate columns are communicated to a query rewriter module 210, where the query rewriter module 210 supports many kinds of structures based on a parser tree. The query rewriter module 210 determines a predicate operator and rewrites the query based on the confidence score. For example, consider the example above where confidence scores for Postalcode and City are determined. As can be seen, the confidence score for the Postalcode is greater than the confidence score for City, so the query was rewritten to reflect the Postalcode and is given as:

Select * from Addresses where Address1 like '% Pennsylvania %' and PostalCode in (81505, 81401).

Figure 7A:
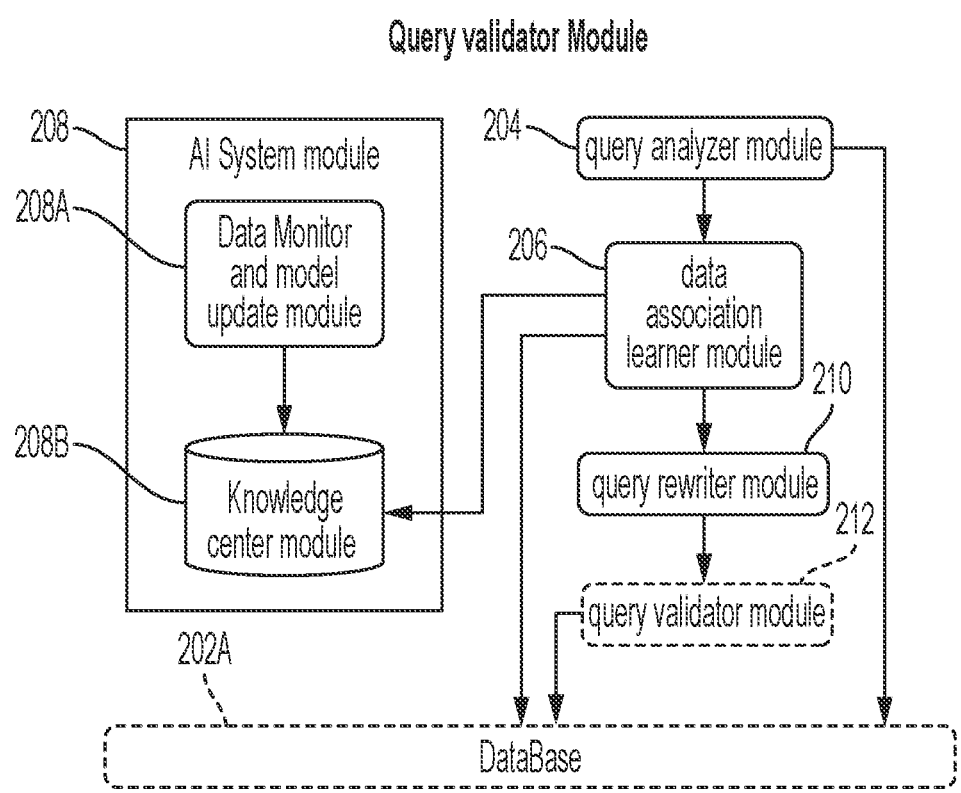
FIG. 7A is a functional block diagram illustrating a query validator, in accordance with one or more embodiments of the present invention.
Figure 7B:
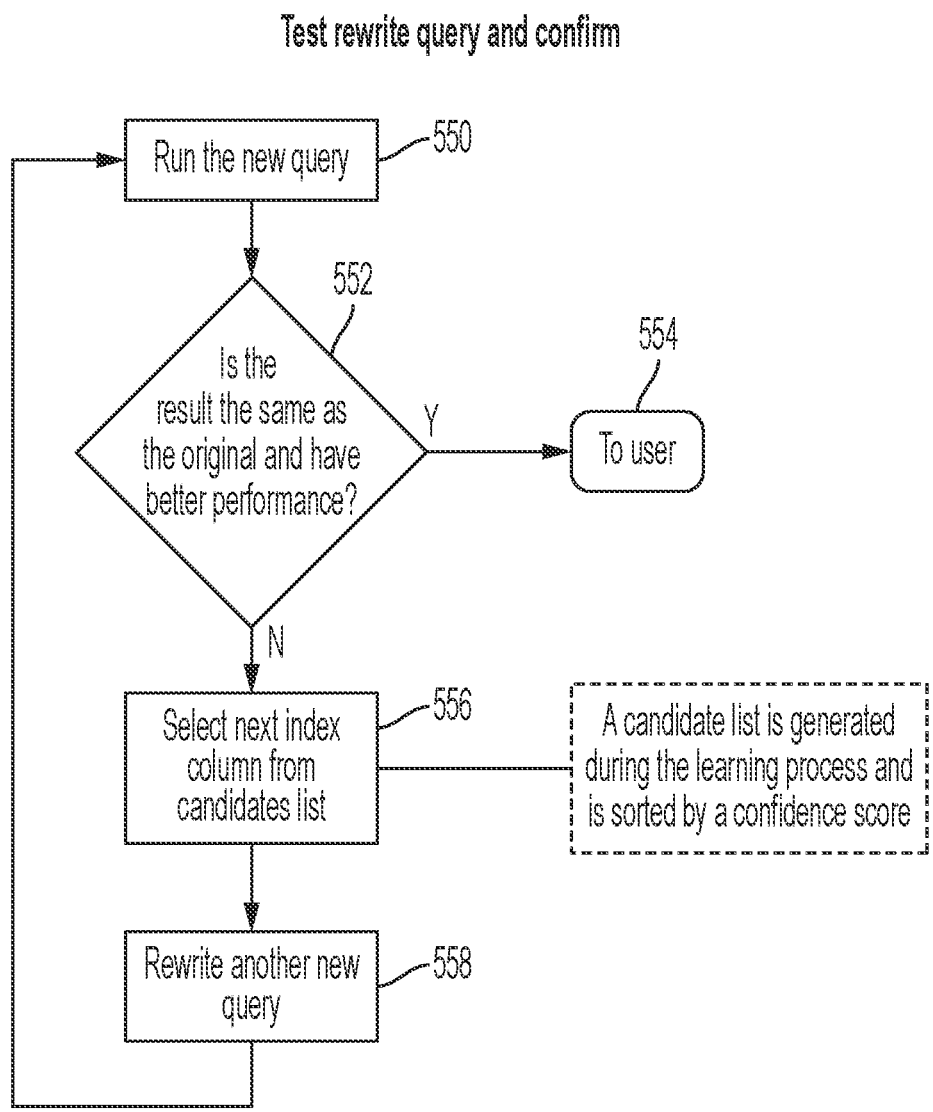
FIG. 7B is a functional block diagram illustrating a query validation process, in accordance with one or more embodiments of the present invention.

Referring to FIG. 7A, FIG. 7B and again to FIG. 3, the rewritten query is then validated by introducing the rewritten query to a query validator module 212 which runs the rewritten query 550 and determines if the result is the same as the result for the original query and has a better performance 552. If the result is the same as the original query and has a better performance, then the rewritten query and the results are sent to the user 554. If the result is not the same as the original query and/or does not have a better performance, then the query rewriter module 210 selects the next index column from the list of the candidate columns 556 and generates a new rewritten query 558. The new rewritten query is then validated by the query validator module 212 as discussed above. This process is then repeated until a satisfactory rewritten query is generated.

It should be appreciated that embodiments of the invention include a method and system to discover potentially poor performing queries using a self-adaptive and on-demand query rewrite approach through semantics for a hybrid cloud database. It should be appreciated that this approach will greatly help users via a transparent use of a hybrid cloud database for their needs to achieve better performance and adaption.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as for improving the query performance of a database application using rewrite, at block 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Figure 8:
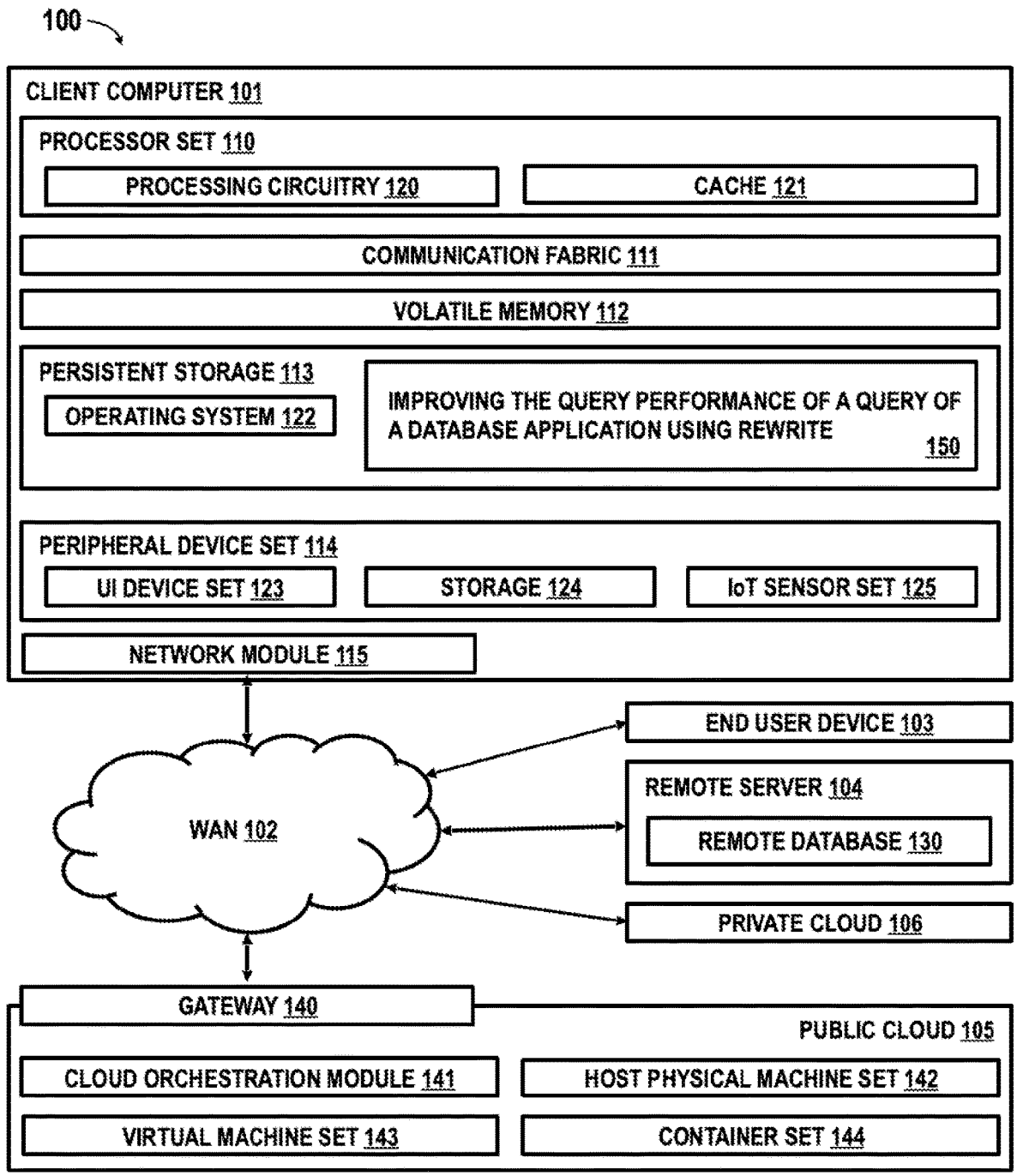
FIG. 8 shows a block diagram of an example computer system for use in accordance with one or more embodiments of the present invention.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 8. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform tasks. More specifically, one or more embodiments described herein can incorporate and utilize rule-based decision making and artificial intelligence (AI) reasoning to accomplish the various operations described herein, namely containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 9:
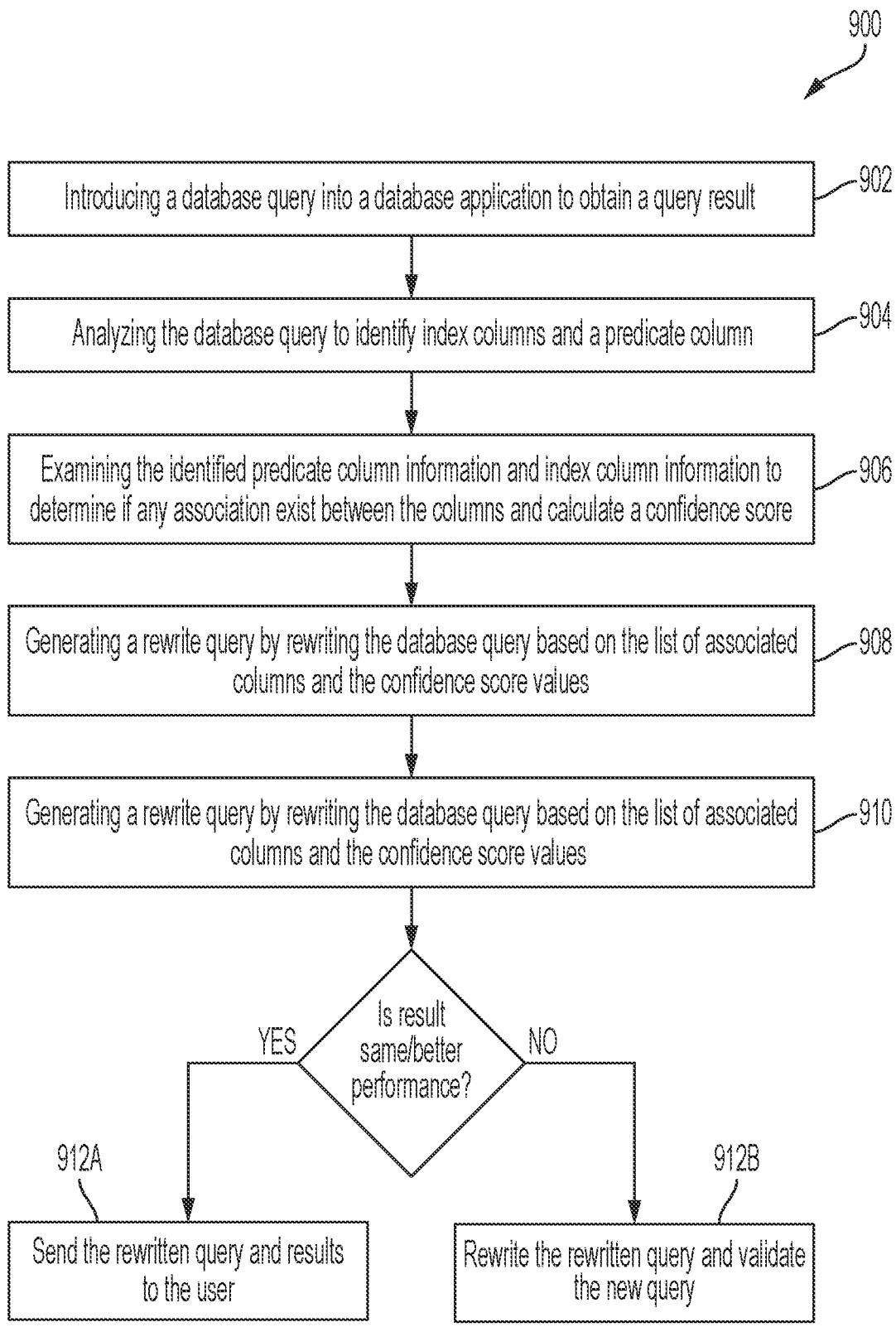
FIG. 9 is a block diagram illustrating a method for improving the query performance of a query of a database application using rewrite, in accordance with one or more embodiments of the present invention.

In accordance with an embodiment, a method 900 for improving the query performance of a query of a database application using rewrite is provided, as shown in FIG. 9 and includes introducing a database query 202 into a relational database 202A, as shown in operational block 902, and analyzing the database query to identify the predicate column and the index columns, as shown in operational block 904. As discussed above, this may be accomplished by introducing the database query into query analyzer module 204 which analyzes the query predicates to identify the query predicate characteristics (such as predicate type, predicate column, etc.) and reads a database catalog 202B of the relational database 202A to obtain database statistics data, such as index definitions, index statistics, index columns, index cluster ratios, etc. to identify the predicate column and the index columns.

The method 900 further includes examining the identified predicate column information and index column information to determine if any associations exist between the columns and to calculate a confidence score, as shown in operational block 906. This may be accomplished by introducing the identified predicate column information and index column information to a data association learner module 206 which examines the predicate column and index columns to determine if any associations exist between the columns. If associations exist, then the data association learner module 206 will select and make a list of the top N associated columns with a strong association with the predicate. On the other hand, if no associations exist, then the data association learner module 206 triggers an AI system module 208 to compute an association between the column in the requested predicate and the other index columns. The computed associations will then be communicated back to the data association learner module 206 which will select and make a list of the top N associated columns with a strong association with the predicate. Using the list of the top N associated columns, the count of the combination of the values in the predicate column and the values in each of the selected columns are calculated along with the cumulative counts for each of the selected columns. Using these results, the confidence score is calculated by dividing the cluster ratio by the cumulate counts.

The method 900 further includes generating a rewritten query responsive to the list of candidate columns and the confidence score, as shown in operational block 908. This may be accomplished by introducing the list of candidate columns and the confidence score into a query rewriter module 210 where the query rewriter module determines the predicate operator and rewrites the query based on at least one of the list of candidate columns and the confidence score. The rewritten query is then validated, as shown in operational block 910, by introducing the rewritten query to a query validator module 212 which runs the rewritten query and determines if the result is the same as the result for the original query and has a better performance. If the result is the same as the original query and has a better performance, then the method 900 includes sending the rewritten query and the results to the user, as shown in operational block 912A. If the result is not the same as the original query and/or does not have a better performance, then method 900 includes rewriting the query, as shown in operational block 912B. This may be accomplished via the query rewriter module 210 which selects the next index column from the list of the candidate columns and generates a new rewritten query. The new rewritten query is then validated by the query validator module 212 as discussed above. This process is then repeated until a satisfactory rewritten query is generated.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein. Moreover, the embodiments or parts of the embodiments may be combined in whole or in part without departing from the scope of the invention.

What is claimed is:

1. A method for improving a query performance of a query of a database application using rewrite, the method comprising:
   introducing a database query into a database application executed by a computer system to obtain a query result;
   analyzing, by the computer system, the database query to identify index columns and a predicate column;
   identifying, by the computer system, associated columns by determining if any associations exist between the index columns and the predicate column;
   calculating, by the computer system, a confidence score value for each associated column of the associated columns responsive to the associated columns and the predicate column;
   generating, by the computer system, a list of the associated columns with the confidence score values;
   automatically, by the computer system, generating a rewritten query by rewriting the database query based on the list of the associated columns and the confidence score values;
   validating the rewritten query by running the rewritten query on a module of the computer system to determine if a rewritten query result has a better performance than the query result; and
   executing, by the computer system, the validated rewritten query by the database application to obtain an updated query result including retrieved data from a storage device.

2. The method of claim 1, wherein analyzing the database query includes analyzing the query predicates to identify query predicate characteristics and to obtain database statistics data, wherein the query predicate characteristics include a query predicate type and a query predicate column and wherein the database statistics data includes one or more of index definitions, index statistics, index columns and index cluster of ratios.

3. The method of claim 2, wherein analyzing the database query includes identifying the index columns and the predicate column responsive to the query predicate characteristics and the database statistics data.

4. The method of claim 3, wherein identifying associated columns includes examining the predicate column and index columns.

5. The method of claim 4, wherein if an association exists between the predicate column and the index columns, then generating a list of associated columns with highest confidence score values; and if no association exists between the predicate column and the index columns, then computing an association between the predicate column and the index columns and the confidence score value for each association and generate the list of the associated columns with the highest confidence score values.

6. The method of claim 5, wherein computing an association includes computing an association using one or more Artificial Intelligent (AI) models.

7. The method of claim 1, wherein validating the rewritten query includes running the rewritten query to obtain a query result and determining whether the rewritten query result is the same as the query result and whether the rewritten query result was achieved with better performance than the query result.

8. A computing system, comprising:
   a processor configured to perform operations for improving a query performance of a query of a database application using rewrite, the operations comprising:
   introducing a database query into a database application executed by the computing system to obtain a query result;
   analyzing the database query to identify index columns and a predicate column;
   identifying associated columns by determining if any associations exist between the index columns and the predicate column;
   calculating a confidence score value for each associated column of the associated columns responsive to the associated columns and the predicate column;
   generating a list of the associated columns with the confidence score values;
   automatically generating a rewritten query by rewriting the database query based on the list of the associated columns and the confidence score values;
   validating the rewritten query by running the rewritten query on a module of the computer system to determine if a rewritten query result has a better performance than the query result; and
   executing the validated rewritten query by the database application to obtain an updated query result including retrieved data from a storage device.

9. The computing system of claim 8, wherein analyzing the database query includes analyzing the query predicates to identify query predicate characteristics and to obtain database statistics data, wherein the query predicate characteristics include a query predicate type and the query predicate column and wherein the database statistics data includes one or more of index definitions, index statistics, index columns and index cluster ratios.

10. The computing system of claim 9, wherein analyzing the database query includes identifying the index columns and the predicate column responsive to the query predicate characteristics and the database statistics data.

11. The computing system of claim 8, wherein identifying associated columns includes examining the predicate column and index columns.

12. The computing system of claim 11, wherein if an association exists between the predicate column and the index columns, then generating a list of the associated columns with highest confidence score values; and if no association exists between the predicate column and the index columns, then computing an association between the predicate column and the index columns and the confidence score value for each association and generate the list of the associated columns with the highest confidence score values.

13. The computing system of claim 12, wherein computing an association includes computing an association using one or more Artificial Intelligent (AI) models.

14. The computing system of claim 8, wherein validating the rewritten query includes running the rewritten query to obtain a query result and determining whether the rewritten query result is the same as the query result and whether the rewritten query result was achieved with better performance than the query result.

15. A computer program product comprising a computer readable storage medium having program instructions embodied therewith, the program instructions executable by a processor to cause the processor to perform operations for improving a query performance of a query of a database application using rewrite, the operations comprising:

introducing a database query into a database application executed by a computer system to obtain a query result;
  analyzing the database query to identify index columns and a predicate column;
  identifying associated columns by determining if any associations exist between the index columns and the predicate column;
  calculating a confidence score value for each associated column of the associated columns responsive to the associated columns and the predicate column;
  generating a list of the associated columns with the confidence score values;
  automatically generating a rewritten query by rewriting the database query based on the list of the associated columns and the confidence score values;
  validating the rewritten query by running the rewritten query on a module of the computer system to determine if a rewritten query result has a better performance than the query result; and
  executing the validated rewritten query by the database application to obtain an updated query result including retrieved data from a storage device.

16. The computer program product of claim 15, wherein analyzing the database query includes analyzing the query predicates to identify query predicate characteristics and to obtain database statistics data, wherein the query predicate characteristics include a query predicate type and the query predicate column and wherein the database statistics data includes one or more of index definitions, index statistics, index columns and index cluster ratios.

17. The computer program product of claim 16, wherein analyzing the database query includes identifying the index columns and the predicate column responsive to the query predicate characteristics and the database statistics data.

18. The computer program product of claim 15, if an association exists between the predicate column and the index columns, then generating a list of the associated columns with highest confidence score values; and if no association exists between the predicate column and the index columns, then computing an association between the predicate column and the index columns and the confidence score value for each association and generate the list of the associated columns with the highest confidence score values.

19. The computer program product of claim 18,
  wherein computing an association includes computing an association using one or more Artificial Intelligent (AI) models, and
  wherein identifying associated columns includes examining the predicate column and index columns.

20. The computer program product of claim 15, wherein validating the rewritten query includes running the rewritten query to obtain a query result and determining whether the rewritten query result is the same as the query result and whether the rewritten query result was achieved with better performance than the query result.

* * * * *